United States Patent [19]

Marino et al.

[11] 4,149,204
[45] Apr. 10, 1979

[54] MINOR BIT REDUCTION ON A MAGNETIC HEAD

[75] Inventors: Peter T. Marino, Boulder; Frank B. Shelledy, Longmont; Edmond W. Smathers, Boulder, all of Colo.

[73] Assignee: International Business Machines Corporation, Armonk, N.Y.

[21] Appl. No.: 782,266

[22] Filed: Mar. 28, 1977

[51] Int. Cl.² ........................... G11B 5/25; G11B 5/27
[52] U.S. Cl. ..................................... 360/119; 360/121
[58] Field of Search ................ 360/119, 121, 122, 70, 360/77, 125

[56] References Cited

U.S. PATENT DOCUMENTS

| 3,049,698 | 8/1962 | Thompson et al. | 360/119 |
| 3,964,094 | 6/1976 | Hart | 360/70 |

Primary Examiner—Robert S. Tupper
Attorney, Agent, or Firm—Joscelyn G. Cockburn

[57] ABSTRACT

A magnetic head assembly for cooperating with a relatively moving medium, on which servo information and data information is recorded, and for reading and/or writing on said medium and for erasing said medium is fabricated so that the effect of pickup interference or unwanted signals during playback is reduced. The magnetic head assembly incorporates a geometry which shifts the signal envelope of the interfering signal so that it is in phase with the signal envelope of the desired signal. The preferred geometry is to dimension the head core so that the distance between two gaps or between a single gap and the edge of the core is equal to the distance between the servo tracks on said medium. Additionally, the gap of the head has a gap null occurring at the frequency of the interfering signal.

10 Claims, 9 Drawing Figures

MINOR BIT REDUCTION ON A MAGNETIC HEAD

BACKGROUND OF THE INVENTION

1. Field of the Invention

The invention relates to an improved magnetic head structure which allows the reading of recorded data, from a magnetic recording media, without picking up spurious signals. More specifically, the invention allows the reading of servo information without suffering servo errors.

2. Prior Art

The use of magnetic heads for recording and reproducing information on a recording media is well known and has become more important in recent years. Although the magnetic recording media may take a plurality of different forms, e.g. disc (flexible and/or solid) tape, etc., there are only few characteristics which are necessary to identify such medias. Generally, a slurry in which magnetic particles are suspended is uniformly spread over a thin supporting structure. The structure is then cured to form a recording media.

When a magnetic field, which is created by a magnetic head, etc., is passed relative to the surface of the recording media, the magnetization of the magnetic particles are aligned in accordance with the applied magnetic field to store data. In order to recover or reproduce the stored data, a magnetic head is positioned relative to the media and by cutting the magnetic lines the recorded data is reproduced.

In order to store and/or retrieve the magnetic data, in an orderly manner, the magnetic media is generally divided into data zones and servo zones. The data zones are the areas in which data is recorded, while the servo zones are the areas in which track following servo information is recorded.

For reproducing the recorded signal the magnetic head is passed relative to the media so as to traverse both data and servo zones. One problem associated with this system is that as the magnetic head traverses the media, spurious readback signals are generated. The spurious readback signals are outputted with the signal envelope which contains the useful data to be recovered. These spurious signals hereinafter called minor bit, present problems for the detection circuits which process the reproduced signals. In fact, whenever the problem occurs in the servo zone, whole data cartridges are sometimes rejected as being defective when, in fact, these data cartridges are good.

The source of the minor bit problem is that in addition to the head gap which does normal reading, the edges of the head core and/or a nonactivated gap in a dual or multiple gap head also reads and outputs signals. Several approaches have been practiced in the prior art to solve the minor bit problem. For example, in one attempt the prior art uses filters to filter out the unwanted signal from the reproduced signal. Although this method works satisfactorily, it tends to increase system cost since the readback circuits are more complex than if the filtering function was not necessary. Also, in the situation where the minor bit is mainly associated with the servo zone of the recording media, the filtering circuit has minimal use since the filtering circuit is only operable for the relatively short period of time when the magnetic head is traversing the servo zone.

In still another attempt the prior art uses shielding to solve the minor bit problem. However, shielding tends to increase head cost and also the complexity of the head. Also, shielding does not solve the minor bit problem in all cases, for example, when the nonactive gap of a dual gap head is reading servo data as the head tranverses the servo zone.

SUMMARY OF THE INVENTION

The above mentioned prior art problems are solved by fabricating a magnetic transducer with unique geometries. The geometries are such that when the head gap reads servo and/or data information on the media, spurious signals (i.e. minor bit) are suppressed or are shifted from the main signal envelope.

In one feature of the invention the magnetic transducer incorporates a single gap position within a magnetic core. The gap is characterized by being a high reluctance magnetic path which is formed between an inner pole piece and the outer pole piece of the core. A coil accessing window is fabricated within the outer pole piece of the core and a pickup coil is wound thereon. The core is dimensioned so that the edge of the core and the gap taken in the direction of head travel are separated by a distance equal to the centerline distance between the servo tracks. The center line distance between the servo tracks are hereinafter called the servo pitch.

In another feature of the invention the magnetic head includes a magnetic core with two gaps fabricated therein. The gaps are so positioned that the spacing between the gaps is equal to the servo pitch spacing.

In still another feature of the invention, one of the gap lengths of the dual gap head is such that a null occurs when reading at servo density.

The foregoing and other features and advantages of the invention will be apparent from the following more particular description of preferred embodiments of the invention, as illustrated in the accompanying drawings.

DESCRIPTION OF THE PREFERRED EMBODIMENT OF THE INVENTION

Although several terminologies and names are used in the literature to define the spurious pulses which are generated by the outside corners of a readback head or the spurious signals generated by one of a nonactivated gap of a dual gap head; the term "minor bit" is the terminology used in this specification to define the spurious signal. As such, the term minor bit, as is used in this specification, means the spurious readback signal envelope which is generated by the edges of a magnetic core or from one of the gaps of a dual gap head.

Figure 1:
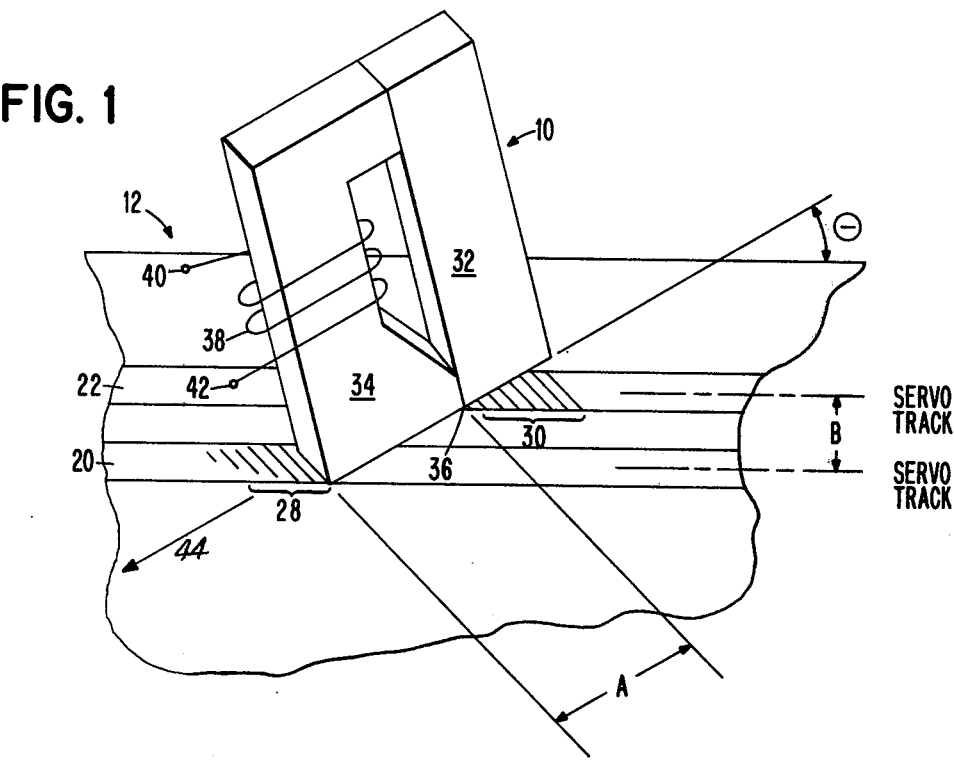
FIG. 1 is an elevational view of a single gap magnetic head which utilizes the geometry of the present invention.
Figure 4:
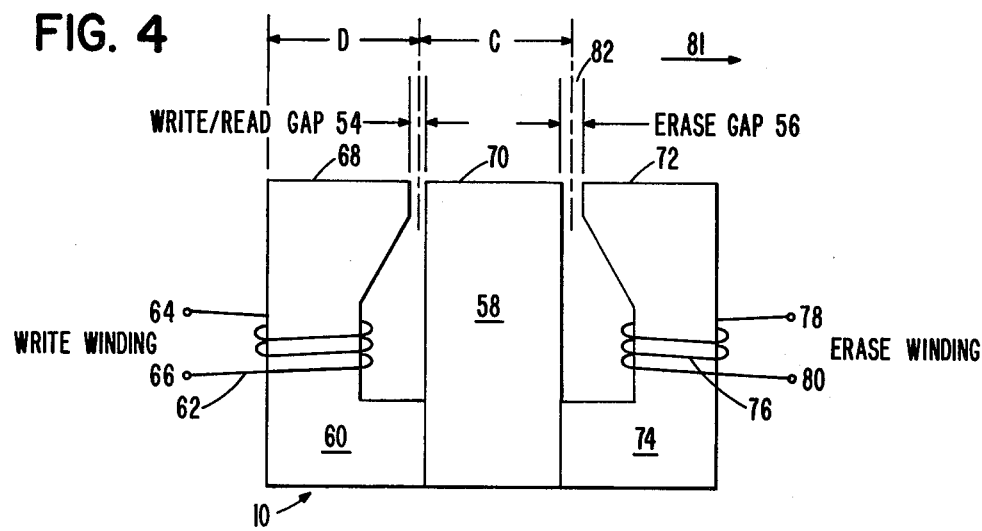
FIG. 4 shows a dual gap magnetic head in which the geometry and the gap width incorporate the present invention.

Referring now to the drawing, and more particularly FIGS. 1 and 4 thereof, there is shown a magnetic transducer or head generally designated by the numeral 10 for cooperating with a relatively moving magnetic medium 12 for reading and/or writing a track or tracks of magnetic information thereon.

Figure 2:
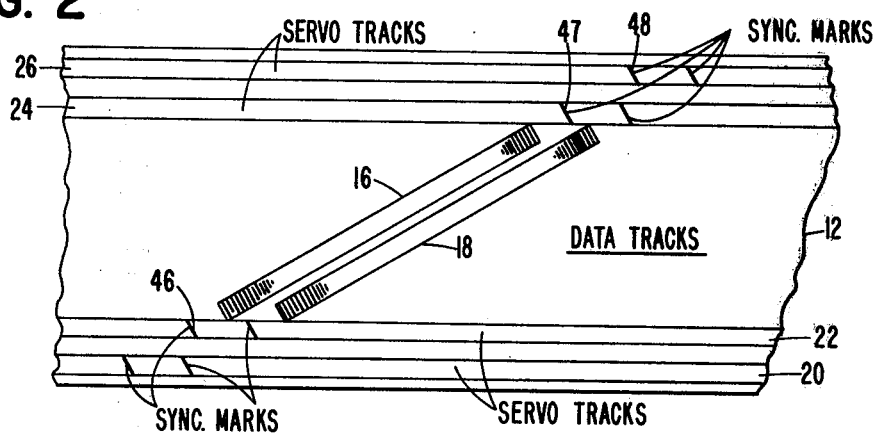
FIG. 2 shows a section of magnetic media with servo and data tracks thereon.

Magnetic medium 12, a section of which is shown in FIG. 1, is shown in greater detail in FIG. 2. Although the magnetic medium 12 is shown as a section of magnetic tape, used in a rotating head device, it is contemplated within the scope of this invention that the magnetic media may take various forms and shapes, for example, a magnetic disk. Magnetic medium 12 includes a data recording section in which a plurality of data tracks are recorded. Two of these tracks, 16 and 18, are shown in the figure. The data tracks are generally inclined at an angle to the elongated edge of the magnetic medium 12. Positioned from either edge of the magnetic medium 12 and to straddle the data tracks are servo tracks 20, 22, 24 and 26 respectively. Positioned in the servo tracks are sync marks which identify the centerline or the ideal head path for a selected data track. Each of the servo tracks has a multiplicity of servo indicia which are substantially parallel to the sync marks. A plurality of these servo indicia identified as 28 and 30 respectively are shown in FIG. 1, where an expanded view of servo tracks 20 and 22 is shown. As will be explained subsequently, the servo indicia, together with the sync marks are used by the magnetic transducer 10 for track following. Track following as is used herein means that the magnetic transducer is aligned (i.e. in registry) with a selected data track. Stated another way, track following means the ability of the magnetic transducer to align with and to traverse a selected data track to read and/or write magnetic information into said track.

Referring again to FIGS. 1 and 4, magnetic transducer 10, which is in accordance with the present invention is shown. The magnetic transducer of FIG. 1 depicts a single gap head while the magnetic transducer of FIG. 4 is a dual gap head, both of which incorporate the present invention.

The single gap head of FIG. 1 includes an inner pole piece 32. A coil window is fabricated in an outer pole piece 34 and the outer pole piece is then attached to inner pole piece 32 to form a conventional transducing gap 36. Gap 36 is characterized by its high magnetic reluctance. In order to establish gap 36 conventional head manufacturing techniques are used. For example, the gap may be an open space which is positioned between inner pole piece 32 and outer pole piece 34, or the gap can be filled with nonmagnetic material; example, glass. A winding 38 is seated on outer pole piece 34 through the window in said pole piece. External circuits for reading and writing are connected to terminals 42 and 40 respectively. In order to achieve the results of the present invention, the effective spacing between gap 36 and the leading edge of outer pole piece 34 is equal to A where A is equal to the effective spacing between the centerlines of the servo tracks at the angle at which the head crosses the servo tracks.

Figure 6:
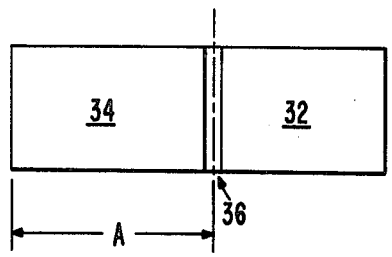
FIG. 6 depicts a top view of the surface of a single gap magnetic head and the relationship of the gap to the edge of the core.

In order for magnetic transducer 10 to read data recorded in the servo tracks, the head enters the track at an angle ($\theta$) and travels in a direction identified by arrow 44. Assume that the normal spacing between the centerline of the servo tracks is identified by B. It can be seen from the geometry of FIG. 1 that the effective spacing A between servo tracks 20 and 22, which is also the required spacing A between the gap 36 and leading edge of transducer 10 is equal to B ÷ sin $\theta$. FIG. 6 shows a plain view of the transducer surface which inerfaces the magnetic media. Gap 36 is formed at the junction of inner pole piece 32 and outer pole piece 34 while dimension A is substantially equivalent to the spacing between the servo tracks at the angle at which the head crosses the servo tracks.

Figure 8:
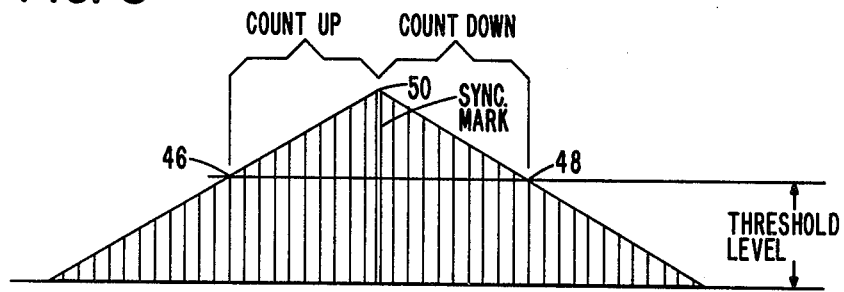
FIG. 8 shows the servo evelope which is read by the readback head. The servo envelope is used to position the read head relative to a selected track.

Before describing the construction of the dual gap head it is worthwhile discussing the problems which are experienced when a head is used which does not conform to the teaching of the present invention. As was stated previously, in order to read or write information from a selected track on the media, magnetic head 10 (FIG. 1) accesses the media at an angle theta ($\theta$) in the direction shown by arrow 44 to read and/or write information from the media. Track following or head media position information is derived from the prerecorded information which is maintained in the servo tracks. FIG. 8 shows the output signal envelope derived from the gap 36 of magnetic head 10. The output signal envelope is substantially diamond shaped, however, after rectification only one-half of the diamond is shown. In order to define track alignment a threshold level shown at points 46 and 48 on the leading and trailing slope of the servo output signal are chosen. Whenever the reading circuit, not shown, are connected to terminal 40 and 42 of winding 38 (FIG. 1), encounters point 46, which is on the leading slope of the servo signal the circuit begins to count up. On reaching the peak of the signal envelope at point 50, a double frequency bit which is supplied by the sync mark is encountered. On encountering this bit, the circuit begins to count downward. Counting downward continues until point 48 is reached. If the head is on track then the contents of the counting circuit is zero. Alternately, if the head is not on track then there is a remainder in the counting circuit and the system is so informed and a servo error is issued. A more detailed discussion of this positioning scheme may be found in U.S. Pat. No. 3,845,500 issued to Gary Hart and assigned to the assignee of the present invention. Although the point 50 of the servo signal is shown with a peak (i.e., pointed), in some designs the peak is flat. This type of track following is called amplitude track following since the alignment of the head with a selected track is dependent on the amplitude of the signal.

Figure 3A:
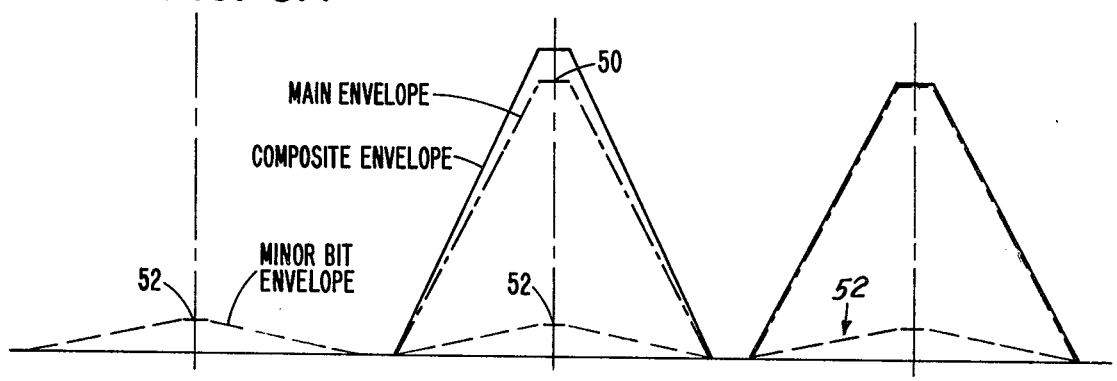
FIG. 3A shows the resulting signal envelope which is read by the magnetic head according to the present invention and is helpful in understanding the operation of the magnetic head.
Figure 3B:
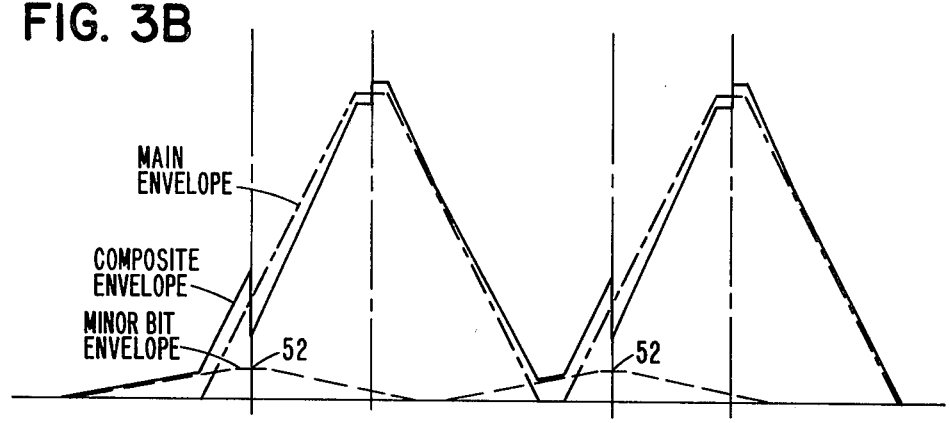
FIG. 3B shows a resulting signal envelope from a magnetic head which does not embody the present invention.

Referring now to FIG. 3B, a signal envelope which is derived from a magnetic head which is not designed in accordance with the teaching of the present invention is shown. This diagram is also helpful in understanding the problem which is caused by the minor bit. As the leading edge of the transducer 10 reads across the servo tracks, the edge reads the recorded information in the servo track and outputs spurious signal envelope identified as the minor bit envelope. As can be seen from the sketch, these minor bit envelopes overlap the main envelope which is derived from the gap of the transducer. Also, the peak 52 of these minor bit envelopes is positioned on the slope of the main envelope. When a composite signal is derived from the minor bit envelope and the main envelope, an irregular shape waveform is created. The discontinuity 51 which occurs in the composite envelope, as a result of the peak of the spurious signal envelope, and the main envelope is due to a 180° phase change occurring with the sync pulse. For example, in FIG. 3B the irregularity or discontinuity occurs on the leading slope, and at the peak of the main envelope. As was stated previously, the system is dependent on the amplitude of the servo signal for track following. By positioning the threshold to coincide with the irregular leading slope of the main servo envelope, the counting circuit issues a plurality of servo errors which affects system throughput when, in fact there is no error.

Turning to FIG. 3A for awhile, the servo signal which is outputted from a head design according to the present invention is shown. As is evident from the figure, the minor bit envelope is so transformed that the peak 52 is either in phase with the peak 50 of the main envelope or out of phase with the peak of the main envelope. When magnetic transducer 10 is designed so that the peak does not coincide with the slope of the main servo envelope, a composite servo envelope is generated which does not have irregular shape (such as discontinuity 51). By positioning a threshold along the leading slope and the trailing slope of the composite signal, the servo error is significantly reduced and data throughput is increased. In order to achieve the result which is shown in FIG. 3A, the transducer of FIG. 1 has a dimension A substantially equivalent to the effective distance between servo tracks.

Referring now to FIG. 4, an alternative embodiment of the invention is shown. In this embodiment of the invention, magnetic head 10 includes dual gaps 54 and 56 respectively. Gap 54 is the so-called write/read gap while gap 56 is so-called erase gap. It should be noted that the function of these gaps may be changed without departing from the scope of this invention. The characteristic of the second embodiment is that magnetic head 10 has two gaps which are positioned relatively close to each other. Although it is within the skill of the art to use conventional magnetic head technology for fabricating magnetic head 10, in the preferred embodiment of the invention magnetic head 10 includes a center pole piece 58. Attached to the center pole piece 58 is first outer pole piece 60 hereinafter called first support relief 60. First support relief 60 is fabricated with a window section which enables write winding 62 to be seated thereon. Write winding 62 is connected to terminals 64 and 66 respectively; this allows write current to enter the winding and data information to be taken from the winding. Position between pole tips 68 and 70 is write/read gap 54. Gap 54 is characterized by having a relatively high magnetic reluctance. The gap is fabricated by conventional means; it may be a mere air gap or the gap may be filled with nonmagnetic material, for example, glass. Likewise, erase gap 56 is formed by positioning pole 72 relative to pole 70. As with first support relief 60, second support relief 74 is fabricated with a window upon which erase winding 76 is seated. Winding 76 is connected to terminals 78 and 80 respectively and functions to transmit current to and from the erase gap 56. As with the single gap head, the spacing C between the centerline of the gaps is equal to the effective distance between servo tracks at the angle of traverse $\theta$. By designing the dual gap head so that the spacing between the gaps is equivalent to the effective spacing between the servo tracks, the envelope of the minor bit signal, which is picked up by the erase head during the time period when the write/read head is reading across the servo tracks to obtain track following information, is in phase with the main envelope. Although the gaps 54 and 56 respectively have been identified as a write/read gap and erase gap, this should not be regarded as a limitation on the scope of the invention since it is within the skill of the art to alter the assignment without departing from the scope of the invention. It is, therefore, noted that one of the important features in the dual gap head is that the distance C must be equivalent to the effective centerline spacing between servo tracks at the angle of head traverse.

Figure 7:
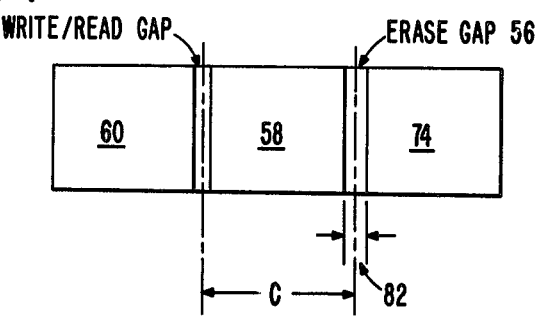
FIG. 7 is a top view of a dual gap magnetic head showing the critical spacing between the gaps.

FIG. 7 shows a flat view of the surface of the magnetic head which interfaces with the magnetic media. As is evident from this diagram, the distance C is the distance between the centerline of the erase gap and the read/write gap. This distance is substantially equivalent to the effective distance between the servo tracks at the angle of traverse.

Figure 5:
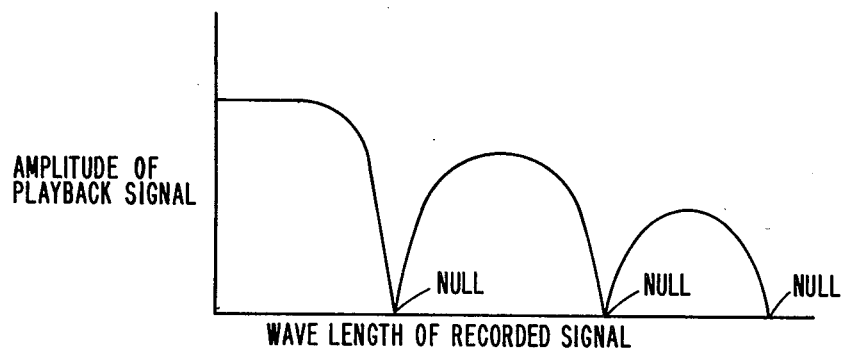
FIG. 5 is a curve showing the amplitude of a readback signal and its relation with the wave length lambda ($\lambda$) of said signal.

Still referring to FIG. 4 and FIG. 7, yet another embodiment of the present invention is shown. In this embodiment of the invention the width 82 of the erase gap 56 is fabricated so that as the magnetic head traverses the servo zone, of the media, minor bit which is picked up by the erase gap is suppressed. This is achieved by making the width of the erase gap so that a null in the gap loss function occurs at the linear density of the servo tracks. It should be noted that this principle is applicable for suppressing one of a plurality of signals recorded at different frequencies or densities. This is done by designing one of the head's gaps to have a null at the frequency of the unwanted signal. Referring to FIG. 5 for awhile, a graph showing the relationship between the amplitude of the playback signal which is outputted from the read head and its relationship with the wavelength (lambda, $\lambda$) of the recorded signal is shown. This graph is helpful in understanding the underlying theory upon which the erase gap is fabricated. As can be seen from the figure, when the null of the recorded signal is present, the output amplitude in the playback head is zero. Therefore, by designing the head gap whose output is not required to read at the null of the recorded signal, the minor bit problem is reduced. In fact, the minor bit is eliminated.

It is known in the recording technology that:

$$\text{Gap Width} = (1/1.12) \times \lambda \qquad \text{(Equ. 1)}$$

where $\lambda = 2/D$; D is linear density in flux changes per unit length.

By substituting the value for $\lambda$ in equation 1, it is determined that;

$$\text{Gap Width} = (1/1.12) \times 2/D; \text{(Equ. 2)}$$

By substituting the density at which a specific signal is recorded in equation 2, then a gap width can be designed which will not read back a specified signal when the gap is traversing recording media upon which the data is recorded. In the preferred embodiment of this invention, the servo data which is to be suppressed has a density of 3440 flux changes per inch, therefore, a gap width of approximately 581 microinches allows the head to read across the servo sector without outputting minor bit from the erase gap.

In the above description of the dual gap head (FIG. 4) it is assumed that for normal operation the direction of head travel relative to the magnetic media (not shown) is depicted by arrow 81. Stated another way, in normal operation the erase gap precedes the write/read gap. This means that the erase gap accesses or encounters recorded data and/or recorded servo information prior to the write/read gap. When the dual gap head is operated in the aforementioned mode, if the width of the erase gap is such that a null in the gap loss function occurs at the linear density of the servo tracks; then the erase gap contribution to the "minor bit" phenomenon is suppressed. Therefore, the distance C (FIGS. 4 and 7) does not have to be equivalent to the effective distance between the servo tracks at the angle of traverse. However, if the erase gap cannot be fabricated so that a null in the gap loss function occurs at the linear density of the servo tracks or if the direction of operation is reversed (i.e. the write/read gap accesses data and/or servo information prior to the erase gap) then in order to suppress or control the "minor bit" the distance D must be substantially equivalent to the effective distance between the servo tracks at the angle of traverse.

Likewise, the corner of the head nearest to the write/read gap of the dual gap head contributes a minor bit if the head is operated (i.e. access data and/or servo information) in the aforementioned reversed mode. To solve this "minor bit" problem, the distance D (FIG. 4) must be substantially equivalent to the effective distance between the servo tracks at the angle of traverse. For optimum control of the "minor bit" phenomenum and to allow reversibility of head operation, distances C and D (FIG. 4) must be substantially equivalent to the effective distance between the servo tracks at the angle of traverse; while the width of the erase gap is such that a null in the gap loss function occurs at the linear density of the servo tracks. All of the three aforementioned characteristics (i.e. the control length of distance C and distance D and the width of the erase gap) must be designed concurrently into the dual gap head for optimum control.

By fabricating a magnetic transducer in accordance with the above described invention, data is reproduced from a magnetic recording surface without minor bit interference. Although the invention is described in a rotatory head environment wherein head/track alignment is maintained from the contents of servo tracks positioned on both edges of a length of magnetic media, this teaching is only explanatory rather than a limitation on the scope of this invention; it is contemplated within the scope of the invention that the described teaching, specifically the magnetic head as is claimed, is applicable in any magnetic recording environment in which the servo track is used for positioning the head relative to a data track, for example, in a disk environment. Also, this head can be used to suppress one of a plurality of signals recorded at different frequencies on a magnetic recording surface.

While the invention has been particularly shown and described with reference to the preferred embodiment thereof, it will be understood by those skilled in the art that various changes in form and details may be made therein without departing from the spirit and scope of the invention.

What is claimed is:

1. A magnetic head assembly, for use with a relatively moving magnetic medium having longitudinal servo tracks and data tracks inclined to said servo tracks, said magnetic head moving traversely across the servo track at a predetermined angle to the longitudinal axis of said servo tracks, comprising:
   a gap for reproducing signals prerecorded on said medium and for recording signals thereon;
   a first pole piece;
   a second pole piece cooperating with said first pole piece to form the gap with the outside edge of said second pole piece having a sharp configuration and being the leading edge of the head; said second pole piece having a lengthwise dimension substantially equivalent to the effective spacing between the servo tracks, at the angle of traverse, said measurement being along the direction of head motion; and
   coil means seated on one of said pole pieces, for reproducing and recording the signals.

2. In a magnetic recorder wherein a recording surface is positioned relative to a recording transducer and said transducer is aligned with a selected data track by use of servo indicia in servo tracks located on said recording surface said transducer moving traversely across the servo tracks at a predetermined angle to the longitudinal axis of the servo tracks the improvement comprising in combination:
   a recording means having spaced longitudinal servo tracks with servo indicia thereon and data tracks inclined to the servo tracks;
   a transducer means, associated with said recording means, having a gap for reading and recording data and having a sharp leading edge;
   said gap positioned so that the distance between the gap and the sharp leading edge of said transducer is substantially equal to the effective distance between the centerlines of the servo tracks, at the angle of traverse.

3. Apparatus for reducing defects in the reproduced servo envelopes of a recorder comprising:
   a length of magnetic media having servo tracks thereon for track following and inclined data tracks;
   said servo tracks are parallel to an elongated edge of said length of magnetic media;
   a magnetic head, having a core geometry with a sharp leading edge a trailing edge and a gap therebetween, operably associated for moving traversely across the servo tracks at a predetermined angle to the longitudinal axis of the servo tracks,
   said magnetic head having a spacing between the gap, and the leading edge substantially equal to b ÷ Sin $\theta$ where b is substantially equal to the spacing between the servo tracks and $\theta$ is substantially equivalent to the inclined angle of the data tracks.

4. An improved magnetic head, for a magnetic recorder in which track following is maintained from the amplitude of signals derived from prerecorded servo indicia located in servo tracks:
   the magnetic head moving transversely across the servo tracks at a predetermined angle to the longitudinal axis of the servo tracks; said magnetic head having:
   a center pole piece;
   a first support relief being operably connected to said center pole piece;
   a first gap being formed by the center pole piece and the first support relief;

first coil operably seated on said first relief;

a second support relief operably connected to said center pole piece;

a second gap being formed by the center pole piece and the second relief;

said second gap being spaced from the first gap a distance substantially equivalent to the effective spacing between servo tracks at the angle of traverse; and a second coil being operably positioned on the second support relief.

5. The device as claimed in claim 4 where the first gap is a read and/or write gap.

6. The device as claimed in claim 4 where the second gap is an erase gap.

7. A magnetic transducer, for cooperating with a relatively moving recording surface in which longitudinal servo tracks are prerecorded and are used for accessing data in tracks inclined to the servo tracks, said transducer moving transversely across the servo tracks at a predetermined angle to the longitudinal axis of said servo tracks, comprising:

a dual gap magnetic head;

said dual gap head having a center core pole piece for separating the gaps and having an effective separating distance substantially equivalent to the spacing between the longitudinal servo tracks at the angle of head traverse.

8. The device as claimed in claim 7 wherein one of the gap's widths is such that a null in the gap loss function is being created at servo density.

9. The device as claimed in claim 8 wherein the gap width is being equal to approximately 581 microinches.

10. A dual gap magnetic transducer for use with an elongated length of magnetic media having adjacent servo tracks thereon, with servo indicia in said tracks, said transducer moving traversely across the servo tracks at a predetermined angle to the longitudinal axis of the servo tracks, comprising in combination:

a center pole piece;

a first support relief connected to said center pole piece;

a first gap formed by the center pole piece and the first support relief;

said gap having a predetermined width to create a null in the gap loss function at the density of the servo indicia in said servo tracks;

first coil operably seated on said first relief;

a second support relief operably connected to said center pole piece;

a second gap formed by the center pole piece and the second relief;

said second gap being spaced from the first gap a distance substantially equivalent to the spacing between servo tracks at the angle of head traverse; and a second coil positioned on the second support relief.

* * * * *